UNITED STATES PATENT OFFICE.

LOUIS L. MOORE AND R. B. S. WHAYRE, OF CALHOUN, KENTUCKY; SAID MOORE ASSIGNS HIS RIGHT TO SAID WHAYRE.

IMPROVEMENT IN COMPOSITIONS FOR THE CURE OF PILES.

Specification forming part of Letters Patent No. 116,474, dated June 27, 1871.

*To all whom it may concern:*

Be it known that we, LOUIS L. MOORE and R. B. S. WHAYRE, of the town of Calhoun, county of McLean and State of Kentucky, have invented a new and useful Invention or Composition as a Remedy for the Piles; and we do hereby declare that the following is a full, clear, and exact description thereof.

The nature of our invention or discovery consists in a composition composed of the following ingredients in their relative proportions, viz.: Pulverized burned alum, one (1) part; boiled or strained honey, three (3) parts; mutton-tallow or grease, six (6) parts; and to enable others skilled in the art to prepare or compound our remedy or composition, we will proceed to describe the manner in which it is done, which is simply that of heating the tallow, and, while in that state, stirring in the ingredients in their relative proportions, and, when cold, it is ready for use.

What we claim as our invention or discovery, and desire to secure by Letters Patent, is—

The pulverized burned alum, the boiled or strained honey, and the mutton-tallow, when compounded or prepared in the manner set forth.

LOUIS L. MOORE.
R. B. S. WHAYRE.

Witnesses:
B B. WHITAKER,
MILES VERTREES.